United States Patent [19]
Florence et al.

[11] Patent Number: 5,652,666
[45] Date of Patent: Jul. 29, 1997

[54] HOLOGRAPHIC 3-D DISPLAY SYSTEM WITH SPATIAL LIGHT MODULATOR

[75] Inventors: James M. Florence, Richardson; Chung Chian Wang; David H. Rester, both of Dallas, all of Tex.

[73] Assignee: Texas Instruments Incorporated, Dallas, Tex.

[21] Appl. No.: 550,179

[22] Filed: Oct. 30, 1995

Related U.S. Application Data

[63] Continuation of Ser. No. 221,636, Mar. 31, 1994, abandoned.

[51] Int. Cl.$^6$ .............. G03H 1/26; G03H 1/30; G02F 1/03; H04N 5/89
[52] U.S. Cl. .............. 359/22; 359/23; 359/242; 359/26; 348/40; 348/41
[58] Field of Search .............. 359/22, 25, 26, 359/27, 30, 32, 33, 9, 20, 21, 23, 242; 348/40, 41

[56] References Cited

U.S. PATENT DOCUMENTS

| | | | |
|---|---|---|---|
| 4,076,370 | 2/1978 | Wako | 359/25 |
| 4,265,509 | 5/1981 | McMahon | 359/25 |
| 4,411,489 | 10/1983 | McGrew | 359/26 |
| 4,421,380 | 12/1983 | McGrew | 359/25 |
| 5,138,471 | 8/1992 | McGrew | 359/25 |
| 5,245,448 | 9/1993 | Waits | 359/25 |
| 5,381,249 | 1/1995 | Burney | 348/40 |

*Primary Examiner*—Paul M. Dzierzynski
*Assistant Examiner*—Audrey Chang
*Attorney, Agent, or Firm*—Julie L. Reed; James C. Kesterson; Richard L. Donaldson

[57] ABSTRACT

A method of using a display system having a spatial light modulator (14) to display holographic images. The spatial light modulator (14) generates images that represent vertical strips of a hologram. These images are de-magnified by a three-dimensional optics unit (18), in the horizontal direction so as to form image strips. A scanning mirror (45) scans the image strips in a series across an image plane at a rate sufficiently fast that the viewer perceives a composite hologram comprised of these image strips.

17 Claims, 2 Drawing Sheets

HOLOGRAPHIC 3-D DISPLAY SYSTEM WITH SPATIAL LIGHT MODULATOR

This application is a Continuation of application Ser. No. 08/221,636 filed on Mar. 31, 1994, now abandoned.

TECHNICAL FIELD OF THE INVENTION

This invention relates to image display systems, and more particularly, to a display system that uses a spatial light modulator to provide three dimensional displays.

BACKGROUND OF THE INVENTION

Holography is an application of laser technology, best known for its ability to reproduce three dimensional images. Early holography was limited to using film to record intensity and phase information of light incident on the scene. More specifically, the principle of operation of film holograms is that the film records the interference pattern produced by two coherent beams of light, i.e., "recording beams". One recording beam is scattered from the scene being recorded and one recording beam is a reference beam. The interference patterns recorded on the film encode the scene's appearance from a range of viewpoints. Depending on the arrangement of the recording beams, and therefore the reconstructing and reconstructed beams, with respect to the film, the hologram may be a transmission-type or reflection-type hologram. For a transmission-type hologram, reconstructing the holographic image is accomplished by shining one of the recording beams, as a "reconstructing" beam, through the developed hologram. By diffraction, the recorded interference pattern redirects some of the light to form a replica of the other recording beam. This replica beam, the "reconstructed" beam, travels away from the hologram with the same variation in phase and intensity that the original beam had. Thus, for the viewer, the reconstructed wavefront is indistinguishable from the original wavefront, including the three dimensional aspects of the scene.

In recent years, computers have been used to generate interference patterns, thereby eliminating the need to capture the scene on film. The interference of the recording beams is simulated on the computer. The computed fringes may then be photographically recorded onto film.

Both photographic and computer-generated holograms require a very high resolution. The distance, L, from one interference fringe to the next depends on the wavelength, $\lambda$, of the light and the angle, $\theta$, between the directions of propagation of the wavefronts. Expressed mathematically, $$L = \frac{\lambda}{2\sin(\theta/2)}.$$

For reasonable angles, this fringe spacing is about the size of a wavelength of visible light, which is about 2 micrometers. The resolution required to produce a useful hologram is at least 500 line pairs per millimeter. In the case of film, fine grain films are available to provide a resolution this fine or finer. In the case of computer-generated holograms, a pixel size of 1 micrometer is required to provide a resolution of 500 line pairs per millimeter.

SUMMARY OF THE INVENTION

One aspect of the invention is a method of using a spatial light modulator to generate holographic images. The SLM is addressed so that it generates an image that represents a vertical image strip of a fringe pattern of a hologram. The image is de-magnified in the horizontal direction so as to decrease its horizontal size. This de-magnified image strip is displayed on an image plane at a first position. This process is repeated for a number of image strips of the hologram, such that the image strips are displayed in a horizontal series across said image plane, at a rate sufficiently fast that a viewer perceives a holographic image on the image plane that is a composite image of the image strips.

A technical advantage of the invention is that it provides a display system for computer-generated holograms, which have sufficient resolution as well as a useful size. By horizontally de-magnifying the images generated by a spatial light modulator, a desired horizontal resolution is achieved. By scanning a number of horizontally de-magnified images, a composite hologram is synthesized from a series of images. The data rates for providing holographic data to the SLM are within the specifications of existing SLM devices.

DETAILED DESCRIPTION OF THE INVENTION

Figure 1:
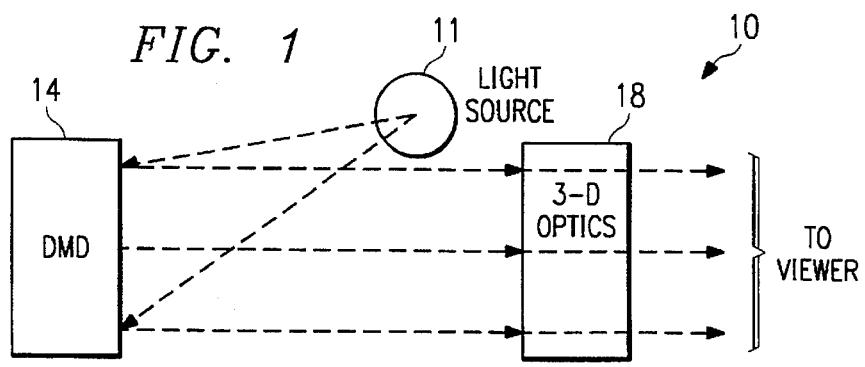
FIG. 1 illustrates a display system that uses a digital micro-mirror device (DMD) to generate holographic images, and a holographic optics unit to process the images into a holographic display.

FIG. 1 illustrates a projection display system 10, which uses a digital micro-mirror device (DMD) 14 to generate holographic images. Display 10 has a holographic optics unit 18 in accordance with the invention, which permits the image generated by DMD 14 to be perceived as a three dimensional image. More specifically, DMD 14 generates a reflection-type hologram, in which the recording film (real or simulated) was arranged so that the recording beams approach it from opposite sides. In this case, the fringes lie parallel to the surface of the recording material, and a reflection-type hologram is formed. The reconstructing beam and the reconstructed beams are on the same side of the hologram.

Light source 11 shines the reconstructing beam on the surface of the DMD 14, whose reflected light is the reconstructed beam. Light source 11 is typically a laser source, so as to provide coherent light appropriate for such reconstruction. As explained below, preferably source 11 is a pulsed source.

As explained below, DMD 14 has an array of tiny mirror elements, which are addressed with data representing the fringe pattern of a hologram. Each addressed array represents a vertical strip of the hologram. Although this description is in terms of a display system that uses a particular type of spatial light modulator, a digital micro-mirror device (DMD), other types of SLMs could be used so long as they are capable of being addressed with holographic data at rates sufficiently fast to minimize flicker. An example of a suitable alternative type of SLM is an electrically addressed liquid crystal device.

Each image generated by DMD 14 is directed through optics unit 18, which as explained below in connection with FIGS. 3–6, de-magnifies the image in the horizontal direction and magnifies the image in the vertical direction. The result is an "image strip", whose pixels are very small in the horizontal direction. A number of these image strips are scanned across an image plane at a rate sufficiently fast to provide a series of adjacent image strips that are perceived as a real image depicting the hologram.

Figure 2:
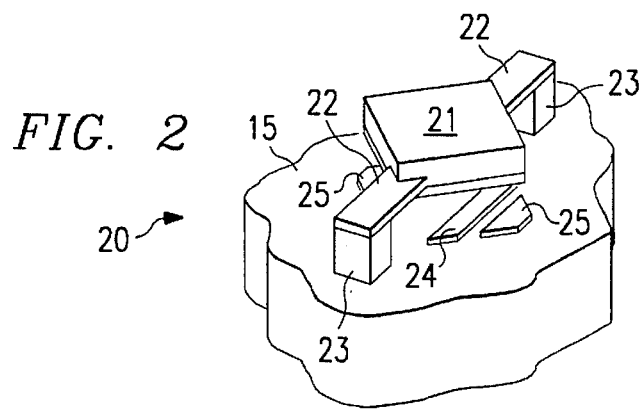
FIG. 2 illustrates a single mirror element of the DMD of FIG. 1.

FIG. 2 illustrates a single mirror element 20 of DMD 14. A typical DMD 14 has an array of hundreds or thousands of such mirror elements 20. In the example of this description, the array has 768 mirror elements per row and 576 rows. When light from source 11 is incident on the surface of the mirror elements 20, each mirror element 20 provides one pixel of an image.

Referring to both FIGS. 1 and 2, light source 11 illuminates the surface of DMD 14 with coherent light. Light source 11 may include a condenser lens (not shown) to direct a beam to DMD 14. Each mirror element 20 has a tilting mirror 21 supported by torsion hinges 22 attached to support posts 23. The mirrors 21 are positioned over an address/memory circuit 15, which is fabricated on a silicon substrate. Electrostatic forces based on the data in the memory cells of address/memory circuit 15 tilt each mirror 21 either about +10 degrees (on) or about −10 degrees (off), thereby modulating the light incident on the surface of the DMD 14. Light reflected from the on mirrors 21 passes through optics unit 18 and creates images on an image plane. Light from the off mirrors is reflected away from the optics unit 18.

Referring now especially to FIG. 2, directly over each memory cell 15, are two address electrodes 24 and two landing pads 25. The mirror 21 has three states. It operates in a bistable mode, tilting approximately 10 degrees about the hinges 22 in one or the other direction. The third state is a flat position to which the mirrors 21 return when the display is not in operation.

In effect, the mirror 21 and the address electrodes 24 form capacitors. When +5 volts (digital 1) is applied to one address electrode 24, 0 volts (digital 0) is applied to the other address electrode 24, and a negative bias to the mirror 21, the electrostatic charge thus created causes mirror 21 to tilt toward the +5 volt electrode 24. The voltage on the address electrode 24 starts the mirror 21 tilting, whereupon it continues under its own momentum until it hits the landing pad 25.

Once a mirror 21 tilts in either direction, it remains electro-mechanically latched in that state. Merely changing the states of the address electrodes 24 will not cause the mirror to move; it is removal of the bias on each mirror 21 that causes it to return to its untilted position. When the bias is reapplied, the mirrors 21 tilt in accordance with their new address states.

The mirror element 20 of FIG. 2 has a "torsion beam" design. However, the invention is useful with other DMD designs. For example, in a cantilever design, a mirror is supported at one end by a hinge and its free end tilts down toward its address electrodes. Further details of various types of DMDs are set out in U.S. Pat. No. 4,956,619, entitled "Spatial Light Modulator"; U.S. Pat. No. 5,061,049, entitled "Spatial Light Modulator and Method"; and U.S. Pat. No. 5,083,857, entitled "Multi-Level Deformable Mirror Device". Each of these is assigned to Texas Instruments Incorporated, and each is incorporated by reference herein.

A DMD 14 such as is illustrated in FIGS. 1 and 2 may be addressed with data representing a computer-generated hologram or with data from a digitized photographic hologram. The on-off pattern of the mirror elements 20 reproduces a vertical strip of the fringe pattern of a hologram. In the example of this description, each strip is 1/33 the width of the complete hologram. For a DMD 14 having 768 pixels per row and 576 rows, each image strip is 1/33 the width of a hologram having 768×33 pixels per line and 576 line. The number of strips into which the hologram is divided is a function of the desired resolution and image size.

Further details of how a DMD is addressed with data for displaying real time images are set out in U.S. Pat. No. 5,079,544, entitled "Standard Independent Digitized Video System"; U.S. patent Ser. No. 08/147,249 (Atty Dkt No. TI-17855), entitled "DMD Display System"; and in U.S. patent Ser. No. 08/146,385 (Atty Dkt No. TI-17671), entitled "DMD Display System". Each of these is assigned to Texas Instruments Incorporated and each is incorporated by reference herein.

Figure 3:
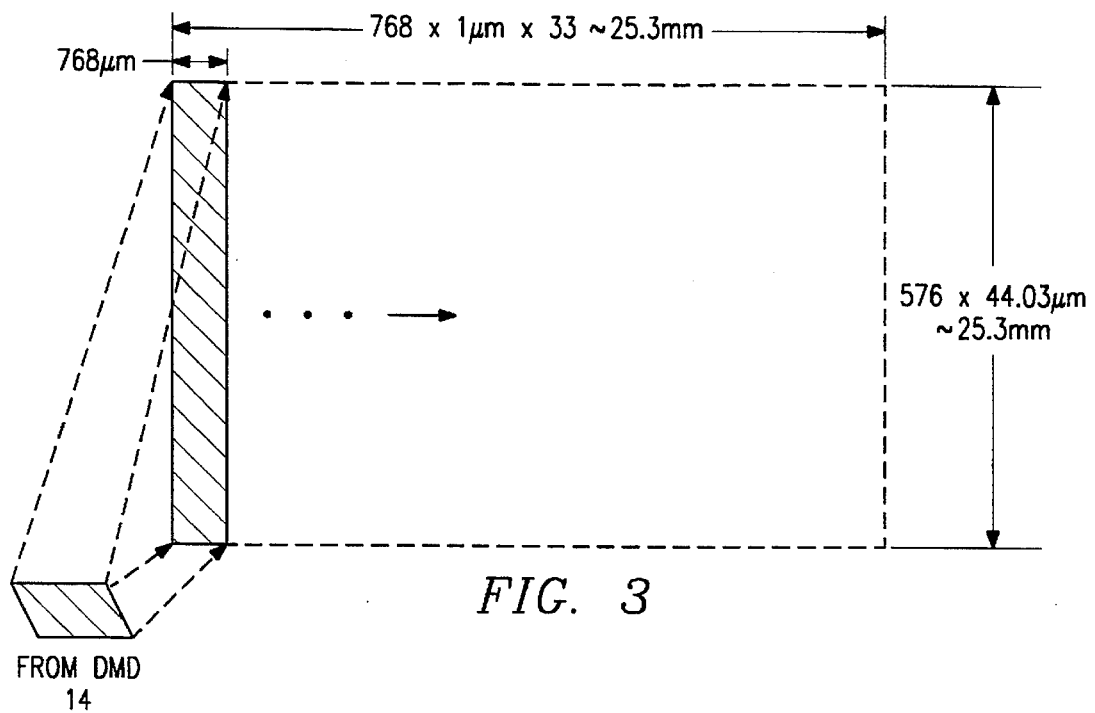
FIG. 3 illustrates how a composite holographic image is synthesized by scanning a number of image strips from the DMD across an image plane.

FIG. 3 illustrates the image plane for a holographic display generated in accordance with the invention. For purposes of example, the image is approximately 1 inch×1 inch. Images of other sizes could be created by modifying the various specifications described herein.

Each image is comprised of 33 vertical image strips. As explained below, optical unit 18 provides these strips by de-magnifying each image generated by DMD 14 ×1/17 in the horizontal direction and magnifying each image ×2.59 in the vertical direction. The effect is to reduce the pixel size in the horizontal direction but increase the pixel size in the vertical direction.

For a DMD 14 having square pixel elements, which have a center-to-center size of 17 micrometers, the result of the horizontal de-magnification is a desired horizontal pixel size of 17(1/17)=1 micrometer. In other words, for a desired pixel width, $d_H'$, the "real" pixel width, $d_H$, is de-magnified by a factor, $M_H$. Expressed mathematically, $$M_H = \frac{d_H'}{d_H}.$$

In the example of this description, the vertical pixel height is determined by the desired height of the image. The result of the vertical magnification is a vertical pixel size of 17(2.59)=44.03 micrometers.

An underlying assumption of the invention is that resolution in the vertical direction can be much courser than in the horizonal direction. An image having a useful size is provided by scanning image strips in the horizontal direction. If desired, the image may also be magnified in the vertical direction. In the example of this description, the vertical magnification results in a square image.

During operation, each image strip is scanned across the image plane, 33 strips per image, sufficiently fast so that the viewer perceives the entire image at once. The resulting image has a horizontal size, $D_H$, determined by the following calculation:

$$D_H = m \times 1 \text{ micrometer per pixel} \times 33 \text{ strips}$$

where m is the number of pixels per line. For a DMD 14 having 768 pixels per row, $D_H$=768×1×33=25,344 micrometers. The image has a vertical size, $D_V$, determined by:

$$D_V = n \times 44.03 \text{ micrometers per pixel}$$

where n is the number of lines per image. For a DMD 14 having 576 rows, $D_V$=576×44.03=25,361.28 micrometers.

These horizontal and vertical dimensions are approximately 1 inch by 1 inch.

Figure 4:
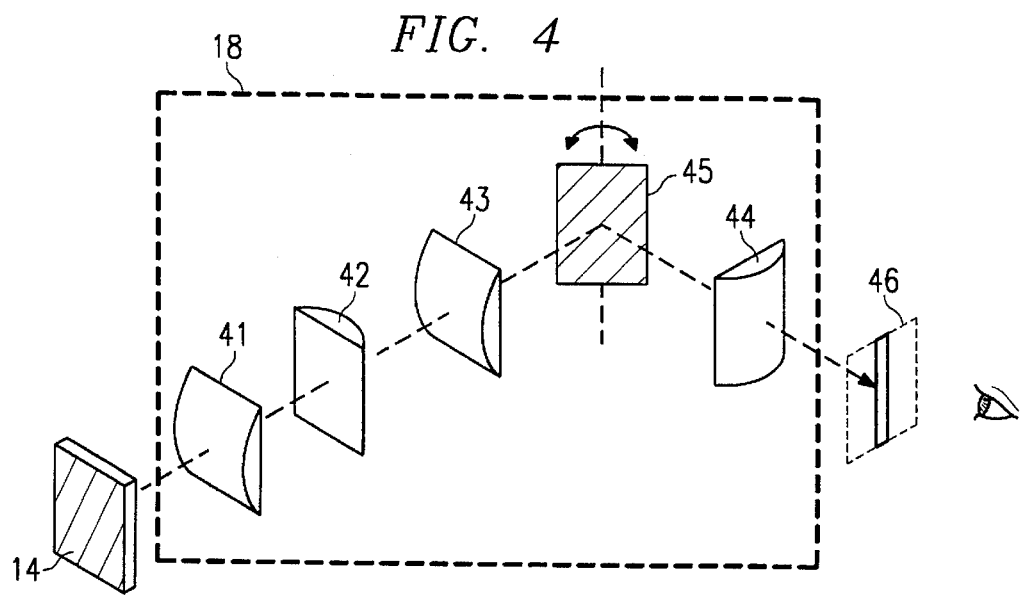
FIG. 4 illustrates one embodiment of the holographic optics unit of FIG. 1.
Figure 5:
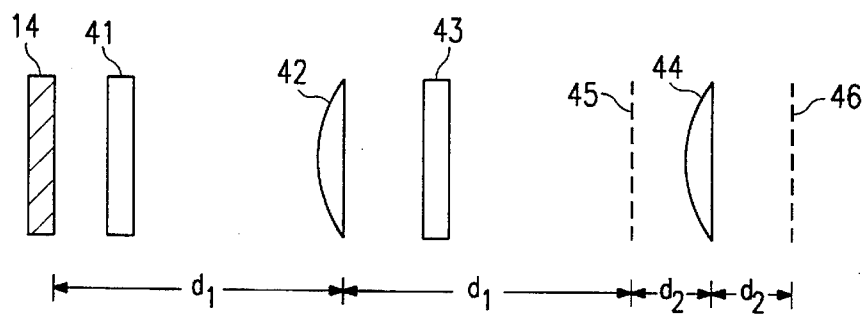
FIG. 5 is a top view of the optics unit of FIG. 4.
Figure 6:
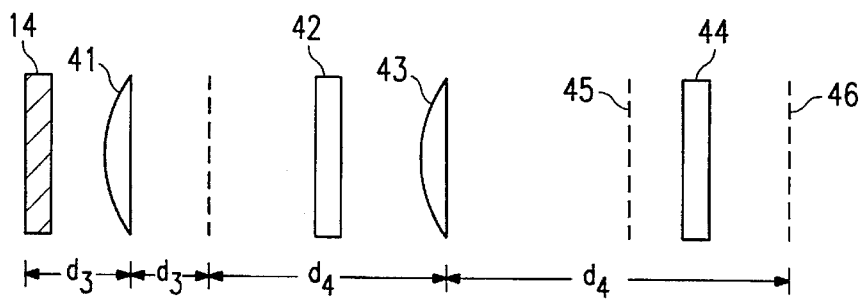
FIG. 6 is a side view of the optics unit of FIG. 4.

FIGS. 4–6 illustrate one embodiment of holographic optics unit 18. FIG. 4 is a perspective view showing a series of cylindrical lenses 41–44, which operate in either the horizontal and vertical direction. FIG. 5 illustrates the horizontally operating lenses 42 and 44, and FIG. 6 illustrates the vertically operating lenses 41 and 43. FIGS. 5 and 6 also illustrate the dimensions of the optical path.

Each image strip reflected from DMD 14 follows an optical path through lenses 41–44. A scanning mirror 45, interposed in the optical path, horizontally scans the image strips from DMD 14 onto the image plane 46.

FIG. 5 is a top view of lenses 41–44, and indicates that lenses 42 and 44 affect the width of the image from DMD 14. A first horizontally de-magnifying lens is placed a distance, d1, from the reflective surface of DMD 14. A second horizontally de-magnifying lens 44 is placed a distance, 2d1+d2, from DMD 14. These distances, d1 and d2, are a function of the desired horizontal de-magnification, $M_H$, and are calculated as follows:

$$M_H = \frac{1}{17} = \frac{d2}{d1}$$

In the example of this description, d1 and d2 are 863.6 and 50.8 millimeters, respectively. The value, 50.8 millimeters is 2 inches, a convenient size when optics unit 18 is to be comprised of commercially available lenses. Other values of d1 and d2 could be used, with a consideration being the total length of the optical path.

FIG. 6 is a side view of lenses 41–44, and indicates that lenses 41 and 43 affect the height of the image from DMD 14. For magnification in the vertical direction, a first vertically magnifying lens 41 is placed a distance, d3, from the reflective surface of DMD 14. A second vertically magnifying lens 43 is placed a distance, 2d3+d4, from DMD 14. These distances, d3 and d4, are a function of the desired vertical magnification, $M_V$, and are calculated as follows:

$$M_V = \frac{2.59}{1} = \frac{d3}{d4}$$

In the example of this description, d3 and d4 are 254.0 millimeters and 659.9 millimeters, respectively. The value 254.0 millimeters is 10 inches, another convenient size when optics unit 18 is to be comprised of commercially available lenses. Other values of d3 and d4 could be used, with a constraint being that 2d1+2d2=2d3+2d4.

Scanning mirror 45 is placed between lenses 43 and 44 at the horizontal Fourier image plane. Although scanning mirror 45 could be placed at other locations in the optical path of optics unit 18, its placement near the end of the optical path reduces the required scanning range.

Although FIGS. 4–6 illustrate de-magnification with a set of two lenses and magnification with a set of 2 lenses, other configurations are possible. For example, only 1 lens for de-magnification or magnification could be used. An advantage of using multiple lenses is that light is more concentrated and aberrations are minimized.

In operation, DMD 14 displays a new image 33 times during every 1/60 second, so as to provide a real time display. This requires the data for each image strip to be loaded to DMD 14 within 505 microseconds.

Because DMD 14 provides the complete 25.4 millimeter wide image (33 image strips) in 1/60 second, the velocity of the scanning action is:

$$\frac{25.4 \text{ millimeters}}{1/60 \text{ second}} = 1524 \text{ millimeters per second.}$$

To freeze each image strip as it is being displayed, light source 11 is strobed on every 505 microseconds, synchronized with the loading of data. To avoid blurring of the image of more than one pixel width (1 micrometer), the pulse of light from source 11 has a pulse shorter than:

$$\frac{1 \text{ micrometer}}{1524 \text{ millimeters per second}} = 0.66 \text{ microseconds.}$$

Although not explicitly illustrated, color images could be provided with a set of three DMDs 14, each illuminated with a differently colored light source 11 and having its own optical path with an optics unit 18. The output from each optics unit 18 would be aligned so that the viewer perceives a composite hologram in color. Alternatively, a system such as illustrated in FIG. 1 could be used with a color wheel, or with pulsed light from source 11 of a series of colors, so as to sequentially provide differently colored images at a rate fast enough to be integrated by the eye.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a spatial light modulator to generate holographic images, comprising the steps of:

accessing holographic data;

generating an image on said spatial light modulator that represents a vertical image strip of a fringe pattern of a hologram represented by said holographic data;

de-magnifying said image in the horizontal direction so as to decrease the horizontal size of said image strip;

displaying said image strip on an image plane at a first position on said image plane;

repeating said generating, de-magnifying, and displaying steps for a number of image strips, wherein said displaying step is performed by displaying said image strips in a horizontal series across said image plane, and wherein said repeating step is performed at a rate such that a viewer may perceive a complete image on said image plane.

2. The method of claim 1, further comprising the step of magnifying said image strips in the vertical direction.

3. The method of claim 1, wherein said repeating step is accomplished with a scanning mirror.

4. The method of claim 1, wherein said repeating step is performed at real time display rates.

5. The method of claim 1, wherein said spatial light modulator reflects incident light, and further comprising the step of illuminating said spatial light modulator with a substantially coherent source.

6. The method of claim 5, wherein said illuminating step is accomplished with a pulsed source.

7. A display system for displaying holographic images, comprising:

means for accessing holographic data;

a spatial light modulator for generating images that represent vertical image strips of a hologram represented by said holographic data;

at least one de-magnifying lens for de-magnifying said image strips in the horizontal direction; and a scanning mirror for directing said image strips to adjacent positions on an image plane such that said scanning mirror scans images produced by said spatial light modulator to allow perception of a complete image comprised of said image strips.

8. The system of claim 7, further comprising at least one magnifying lens for magnifying said images in the vertical direction.

9. The system of claim 7, wherein said scanning mirror is interposed between said at least one de-magnifying lenses and said image plane.

10. The system of claim 7, wherein said set of de-magnifying lenses comprises multiple lenses.

11. The system of claim 7, wherein said set of de-magnifying lenses comprises a single lens.

12. The system of claim 7, wherein said spatial light modulator is a digital micro-mirror device.

13. The system of claim 7, wherein said spatial light modulator is a liquid crystal device.

14. The system of claim 7, wherein said spatial light modulator reflect incident light, and further comprising a source for said incident light that provides substantially coherent light.

15. The system of claim 14, wherein said source is a pulsed source.

16. The system of claim 7, further comprising a color wheel for filtering said image strips.

17. The system of claim 7, further comprising additional spatial light modulators, de-magnifying lenses, and scanning mirrors, each for providing a different color of said image strips.

* * * * *